United States Patent
Denance

[19]
[11] Patent Number: 6,158,296
[45] Date of Patent: Dec. 12, 2000

[54] TRANSMISSION WITH STRUCTURALLY SIMPLIFIED GEAR RATIO

[76] Inventor: Raymond Denance, le Commodore H 41, Marina Baie des Agnes, F-06270 Villeneuve Loubet, France

[21] Appl. No.: 09/380,962

[22] PCT Filed: Mar. 14, 1997

[86] PCT No.: PCT/FR97/00458

§ 371 Date: Oct. 27, 1999

§ 102(e) Date: Oct. 27, 1999

[87] PCT Pub. No.: WO98/41780

PCT Pub. Date: Sep. 24, 1998

[51] Int. Cl.[7] ............................................. F16H 3/30
[52] U.S. Cl. ........................... 74/351; 74/416; 74/450
[58] Field of Search ........................... 74/393, 395, 416, 74/446, 447, 448, 450, 351; 475/196, 197

[56] References Cited

U.S. PATENT DOCUMENTS

| | | | |
|---|---|---|---|
| 619,551 | 2/1899 | Ferris | 74/351 |
| 682,861 | 9/1901 | Rittman | 74/351 |
| 767,866 | 8/1904 | Busche | 74/351 |
| 1,188,641 | 6/1916 | Formage | 74/351 |
| 2,033,850 | 3/1936 | Roberts | 74/416 X |
| 2,780,110 | 2/1957 | Kopa | 74/416 X |
| 5,251,504 | 10/1993 | Summerville, Jr. et al. | |
| 5,467,660 | 11/1995 | Barens | 74/351 |
| 5,496,049 | 3/1996 | Escobedo | 74/351 X |

FOREIGN PATENT DOCUMENTS

| | | | |
|---|---|---|---|
| 524666 | 9/1921 | France | 74/351 |
| 877.542 | 12/1942 | France . | |
| 2 742 203 | 6/1997 | France . | |
| 2 252 552 | 5/1974 | Germany . | |
| 624265 | 6/1949 | United Kingdom | 74/351 |
| 2 263 953 | 8/1993 | United Kingdom . | |

*Primary Examiner*—Charles A Marmor
*Assistant Examiner*—Ha Ho
*Attorney, Agent, or Firm*—Young and Thompson

[57] ABSTRACT

A transmission (1) comprising a gear assembly for transmitting a rotary motion from a driving shaft (2) to a driven shaft (3), with variable gear ratio, the two shafts (2 and 3) not being coaxial. This transmission consists in: a gear-wheel (4) axially split into two half-gear-wheels (5 and 6) one (5) axially mobile relative to the other (6) and also relative to one of the shafts (3) supporting them, the two half-gear-wheels (5 and 6) being fixed in rotation relative to this shaft (3); a plate (7), integral with the other shaft (2), comprising, on at least one of its surfaces, several gear teeth, concentric (8 to 11) with this shaft (2), cooperating with the gear-wheel (4); and elements for axially displacing the two half-gear-wheels (5 and 6) to alter the geared concentric tooth (8 to 11), thereby shifting the gear ratio. The invention is preferably applicable to land vehicles.

18 Claims, 4 Drawing Sheets

TRANSMISSION WITH STRUCTURALLY SIMPLIFIED GEAR RATIO

CROSS-REFERENCE TO RELATED APPLICATION

This is the 35 USC 371 national stage of international application PCT/FR97/00458 filed on Mar. 16, 1997, which designated the United States of America.

FIELD OF THE INVENTION

The present invention relates to a transmission with speed ratio change, which is a very simple structure. This transmission is present in the form of a simple gearing in its simplest version.

BACKGROUND OF THE INVENTION

The state of the art can be defined by the following documents.

The document WO-A-89/09895 has for its object an apparatus with gearing which comprises a first gear element, as well as a second and a third gear element engaging with said first gear element, such that the rotation of the first gear element is transmitted to the second and third gear elements, or such that the rotation of the second and third gear elements is transmitted to said first gear element. Said first gear element comprises assemblies of elongated gear teeth defining a portion of a conical shape, the gear teeth, located in each assembly, being parallel to each other, and several of said gear teeth in each assembly being of different lengths. The second and third gear elements are connected such that they turn at the same speed during operation of said gear apparatus. Said second and third gear elements are movable along the gear teeth of each assembly, so as to vary the gear ratio between the first gear element and the second and third gear elements.

Although of novel structure, this apparatus is complex in structure, with a very large number of moving parts. The use of a central cone, as a first gear element, is consumptive of space. This volume is greater as the number of ratios is greater. Finally, between the tooth assemblies, there are smooth regions in which the engagement of the second and third gear elements is not carried out; there is thus a differential force on the teeth of these elements, which is not at all adequate for reliability of the apparatus.

The document FR-A-2.640.342 discloses a speed varier, with gearing always engaged, which is provided with a shaft (and its pinion, one or the other) sliding parallel to the principal conical gearing, and by a cone constituted of stacked toothed wheels which are not joined and by two toothed spirals, one rising, the other descending, which cross without interference of the teeth of the intervals thanks to their number and specific dimensions and to their male shape (pinion) and female shape (cone) such that the pinion engages, either in a circular trajectory (speed ratios) without axial pressure on the shaft, or on the spirals (with axial pressure), but not between the two. The figure represents the projection on a plane of the principal conical gear, at the level of the diameter of the foot. The beveled lozenges represent the impression of the tips of the teeth of the pinion; the double concave bevel teeth are taken en masse.

This device, like the preceding one, uses a cone constituted by stacked toothed wheels, such that it is voluminous with many moving parts.

The document FR-A-877.542 provides a gear system having teeth constituted by one or several rows of movable balls disposed in recesses provided on primary diameters of independent bodies, engaging in corresponding recesses or roller tracks provided in the primary diameters of the wheels, pinions, or plates with which they are to be coupled.

The gear system proposed here requires the use of heavy and costly equipment because the plate must be releasable and the pinion must be manipulated. There are thus necessarily two independent manipulating mechanisms.

The document GB-A-2.263.953 relates to a gear system which can consist in one or two hard metal disks in which have been cut recesses of a shape suitable for the intervals between chords (all equal in length), to form circles of suitable selected radii, in which a movable toothed wheel or pinion can be engaged by means of a selection mechanism with radial sliding when the disk is in stationary position at the level of certain points of alignment, called primary radii, thereby permitting a speed selection and coupling loads to drive it. A combination of gear disks is provided with a single conductive shaft, for rotation in a drill or the propulsion of a bicycle, which ensures a wide range of speed change (relative speed and torque), and the movement of rotation will be transmitted from the disk having the recesses, which turn under the action of pedals, to a toothed wheel secured to a squared or keyed shaft which transmits the movement to a similar toothed wheel, located at the other end of the shaft, which is in engagement, during its rotation, with the disk having recesses, secured to the rear wheel, which propels the bicycle.

In this case, clutching is ensured by the displacement of the pinion relative to the plate at the level of the first radii, which are in fact substantially radial grooves in the plate. There are three essential drawbacks in this system. In the first place, there is wear of the teeth of the pinion because of the translation of the level of the first radii. Secondly, the time available to carry out the speed change is limited to the time of engagement of the two adjacent teeth of the pinion. Thirdly, the solidity and balance of the plate, which have two grooves at a precise position, are not guaranteed.

The present invention provides simple and low volume mechanism which solves the problems existing in the prior art.

SUMMARY OF THE INVENTION

The transmission according to the invention permits avoiding clutching of the plate. Moreover, the teeth of the pinion are not subjected to any translatory movement, the time available to carry out speed change is equal to the period of rotation of a half-pinion, finally, the plate is completely uniform, which is to say with grooveless recesses. This transmission is hence more simple and more reliable.

To this end, the invention relates to a transmission comprising at least one gear adapted to transmit rotary motion from a drive shaft to a driven shaft, with variable speed ratio, the two shafts being not coaxial, one of the shafts carrying a pinion, and the other shaft carrying a plate, characterized by the fact that it is constituted, firstly of the pinion axially split into two half-pinions movable axially relative to each other and also relative to the shaft which supports them, the two half-pinions being fixed in rotation relative to the shaft, secondly of the plate, secured to the other shaft, comprising, on at least one of its surfaces, several teeth, concentric to this shaft, which coact with the pinion, and thirdly means for axially moving the two half-pinions so as to change the engaged concentric teeth and thus the speed ratio.

The pinion comprises 2n teeth, each half-pinion comprising n teeth and each concentric set of teeth of the plate comprising a multiple of n teeth, n being a positive whole number.

The distance separating two adjacent teeth of the pinion, the two half-pinions being in the same plane, is identical to the distance separating two adjacent teeth of a same concentric set of teeth of the plate.

The difference existing between the number of teeth of two concentric adjacent sets of teeth of the plate is equal to n or to a multiple of n.

The plate comprises a region for changing concentric sets of teeth engaged by the half-pinions, which is formed by alignments of two adjacent teeth of each concentric set of teeth, the two alignments being parallel and located on opposite sides of a radius of the plate, a so-called initial radius.

In this change region, the distance separating two adjacent teeth of a same alignment is constant.

According to one embodiment, the teeth of the pinion have a spherical shape, and the teeth of the concentric sets of teeth are constituted by the edges of transverse blind holes provided on at least one surface of the plate.

According to a second embodiment, the teeth of the pinion have a spherical shape, and the teeth of the concentric sets of teeth are constituted by the edges of transverse bores provided in the plate.

In no matter what embodiment, the shaft, which carries the axially movable pinion fixed in rotation relative to the shaft, is, in transverse cross-section, channeled on at least the length of the shaft coacting with the pinion, this form creating at least one groove ensuring the axial mobility and the securement in rotation of each half-pinion of complemental shape relative to said shaft.

Moreover, the H shape in transverse cross-section of the pinion shaft is constituted by a square groove on two of its opposite surfaces.

On opposite sides of the plane formed by the pinion, said pinion is prolonged in the form of two skirts of a shape complementary to the subjacent shaft.

According to a modified embodiment, the pinion shaft is the drive shaft and the plate shaft is the driven shaft.

According to another modification, the plate shaft is the drive shaft and the pinion shaft is the driven shaft.

The axes of the shafts of the pinion and of the plate are perpendicular and intersect.

In one embodiment, the plate coacts with at least one other pinion of identical structure.

In an embodiment which uses two plates comprising blind holes side by side and open at their free surfaces, the transmission is characterized by the fact that at least one pinion coacts with one of the surfaces and at least one other pinion coacts with the other surface.

According to a particular embodiment, wherein several pinions coact with one plate provided with transverse bores, at least one pinion coacts with one of the surfaces of the plate and at least one pinion coacts with the other surface.

The use of a transmission as set forth above, is characterized in that, upon change of engaged concentric tooth sets, the axial plane, defined on the one hand by one of the half-pinions and on the other hand by the other half-pinion, passes through the initial radius of the plate.

BRIEF DESCRIPTION OF THE DRAWINGS

The accompanying drawings are given by way of indicative examples and are not limiting. They show an embodiment according to the invention. They permit easy comprehension of the invention.

Finally.

DETAILED DESCRIPTION OF THE INVENTION

Figure 1:
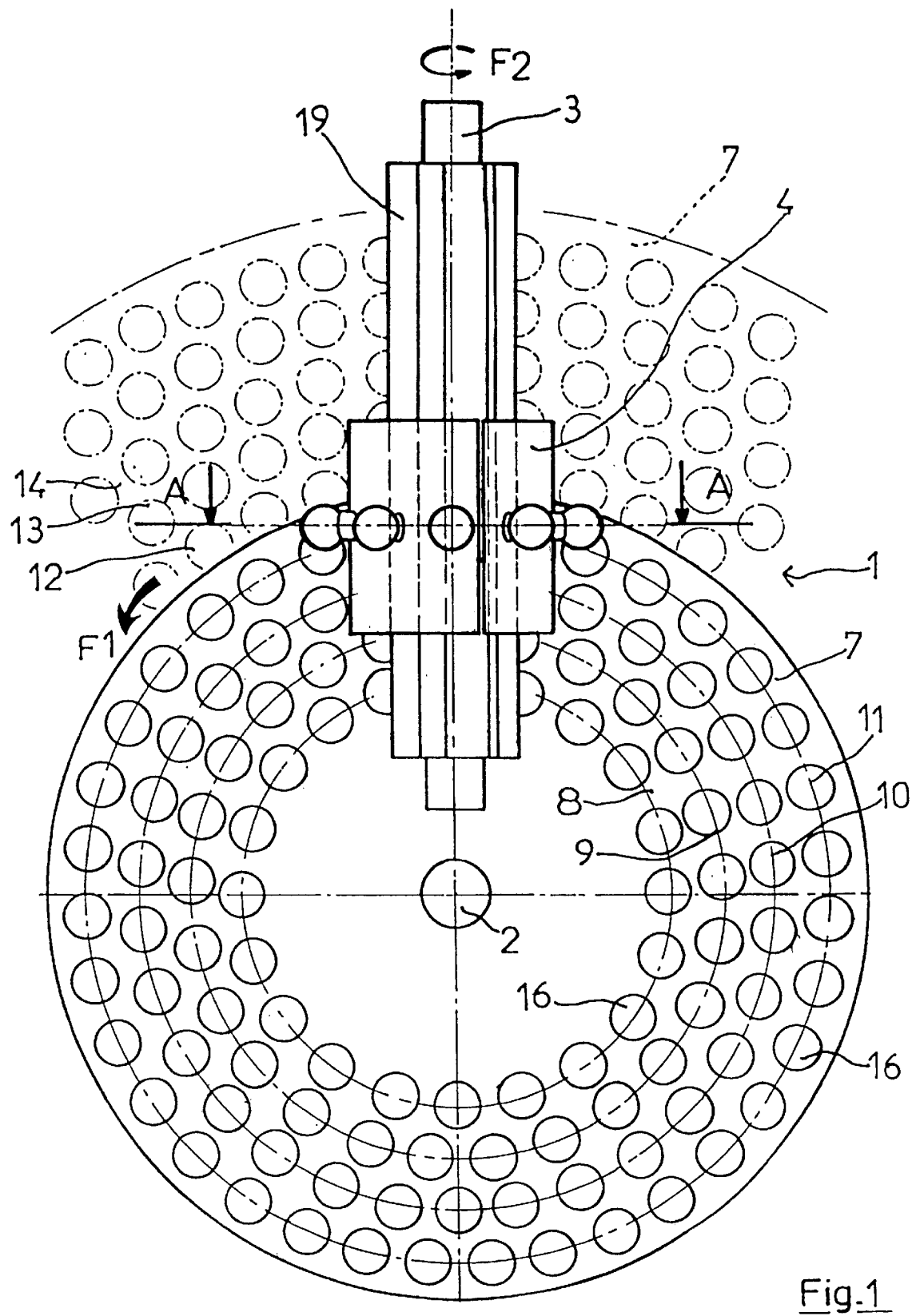
FIG. 1 is a front view of the plate and of the profile of the pinion, the two half-pinions coacting with a single concentric set of teeth of said plate.

The present invention relates to a new type of transmission 1, whose principle is based on simplicity. Thus, this transmission 1 is solely constituted by a gear, itself formed by a pinion 4 and a plate 7.

To permit rapid change of speed ratio, it is necessary that the plate comprise a plurality of concentric recesses 8 to 14, and that the pinion 4 comprise displacement means permitting changing the ratio.

This pinion 4 is thus constituted by two half-pinions 5 and 6. These two half-pinions are of identical shape and correspond to an axial split of said pinion 4.

Figure 2:
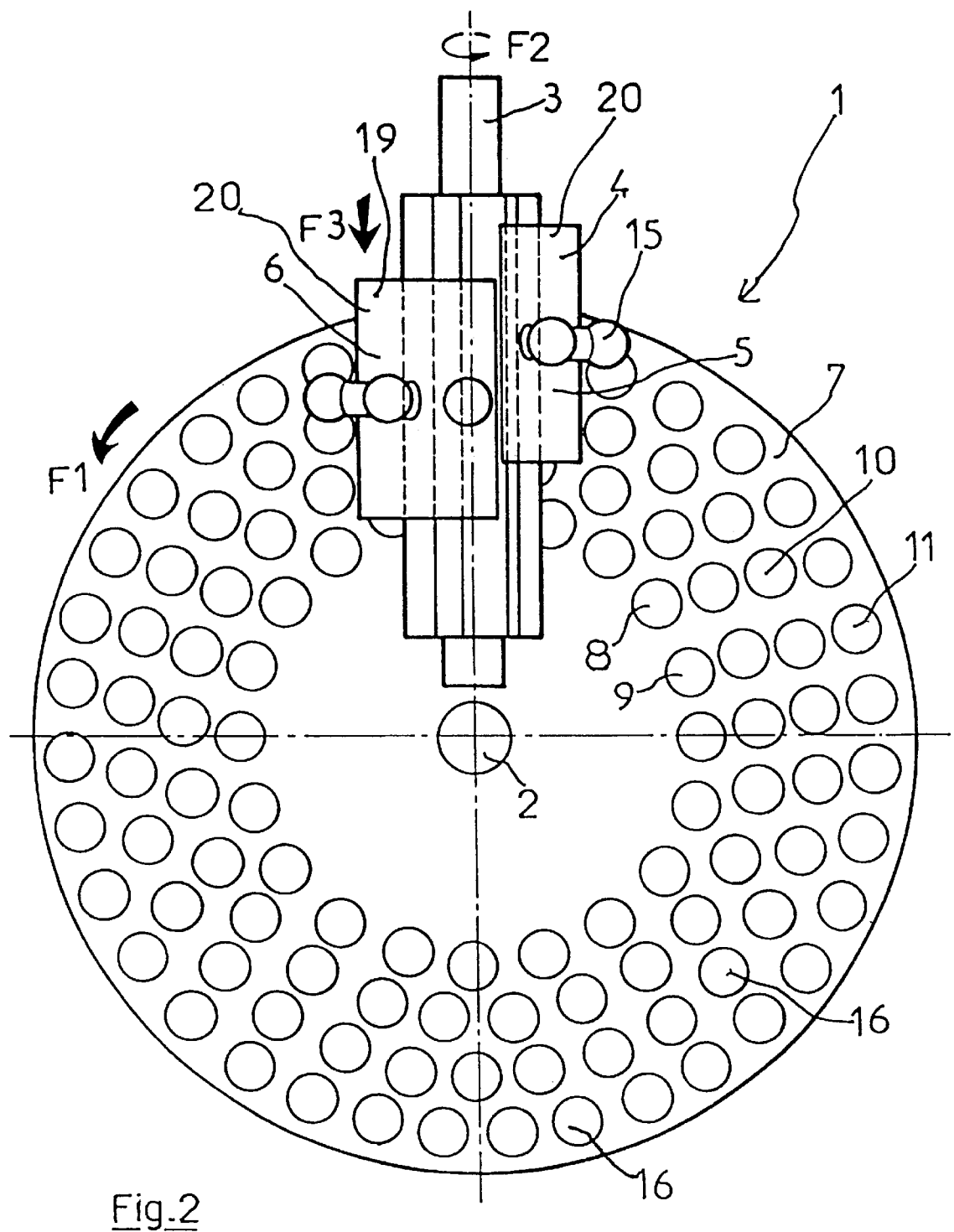
FIG. 2 shows a view identical to FIG. 1, but in which the half-pinions each coact with a different concentric set of teeth, which is to say upon change of ratio.

The displacement means are not described in the figures, they permit axial displacement of the two half-pinions 5 and 6 relative to each other, according to the arrow F3 in FIG. 2.

Pinion 4 and plate 7 are each secured to a shaft, respectively 3 and 2.

According to the embodiment shown in the figures, the shaft 2, associated with the plate 7, constitutes a drive shaft. The shaft 3 itself is associated with the pinion 4 and constitutes the driven shaft.

Nevertheless, it is entirely possible that the shaft 2 associated with the plate 7 be the driven shaft and the shaft 3 associated with the pinion 4 be the drive shaft.

Figure 3:
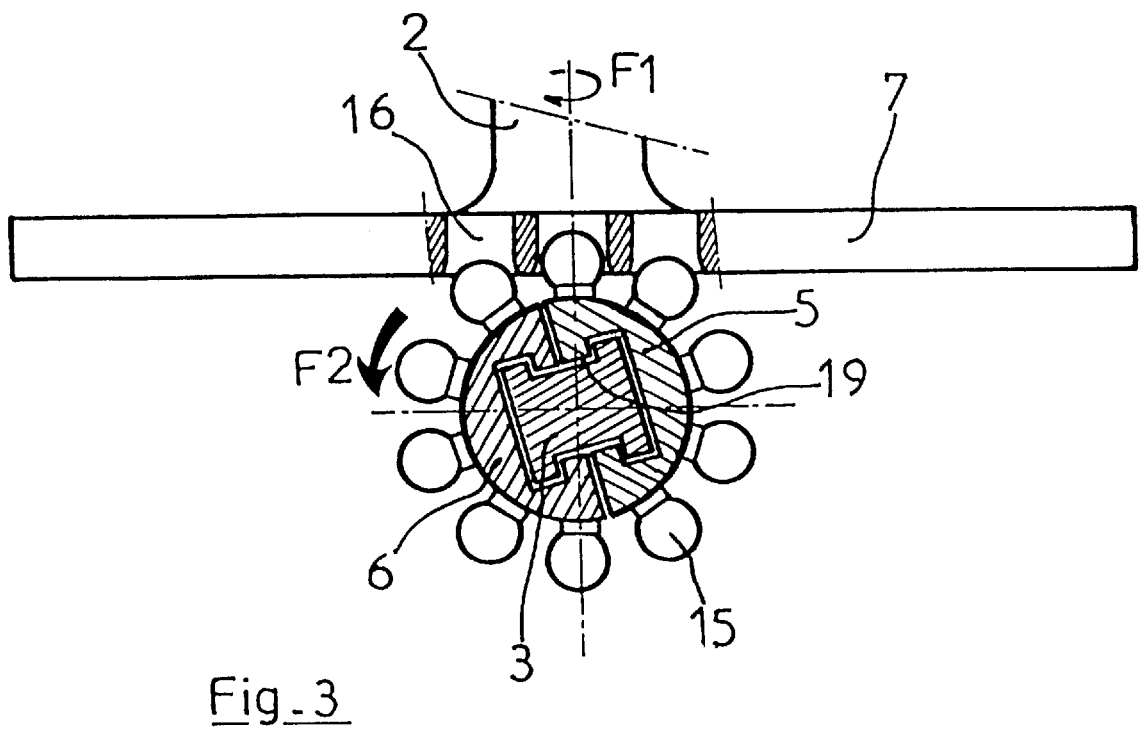
FIG. 3 is a cross-sectional view on the line A—A of FIG. 1.

No matter what the embodiment, said pinion 4 and shaft 3 are movable in the direction of the arrow F2 of FIGS. 1 to 3, and the plate 7 and the shaft 2 are movable in the direction of arrow F1.

The shafts 2 and 3 are in fact in p perpendicular position and their longitudinal axes intersect.

So that the transmission of movement will be possible, the pinion 4 and the plate 7 are provided with a multitude of teeth 15 and 16.

The teeth 15 of the pinion 4 have a spherical head to facilitate the introduction of said teeth 15 into the transverse bores 16 whose edges constitute the teeth 16 of the plate 7. This is clearly visible in FIG. 3.

Figure 5:
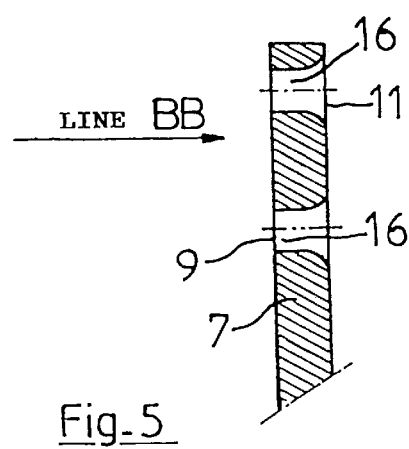
FIG. 5 shows a cross-sectional view on the line B—B of FIG. 4.

In a particular embodiment shown in FIG. 5, the surface of the plate 7 is beveled in a rounded manner at the level of the transverse bores 16, so as further to facilitate the introduction of the spherical teeth 15 into the bores 16.

Of course, the plate 7 could also be constituted by blind holes on one of its surfaces or on its two surfaces, so that other pinions can be implanted on the same surface or on the opposite surface to that which already coacts with the pinion 4, as described. A plate 7, with transverse bores 16, can also coact with several pinions 4 on its two surfaces.

So that all this transmission 1 can operate correctly, it is necessary that certain characteristics be present.

Thus, in the drawings, the number of teeth 15 and 16, the dimensions, distances and proportions are calculated to permit the good operation of said transmission 1.

In the illustrated case, each half-pinion 5 or 6 comprises five teeth 15, the pinion 4 having ten teeth. Of course, the axial split between the two half-pinions 5 and 6 is between two teeth 15 and not across said teeth 15.

Concentrically with the shaft 2, the plate comprises concentric tooth sets 8 to 14. The innermost tooth set 8 comprises twenty transverse bores 16. The adjacent and next outer set of teeth 9 comprises fifteen, and so on with the tooth set 10 having thirty recesses bores, the set of teeth 11 having thirty-five recesses, each adjacent tooth set comprising a number of bores 16 greater than five to the outermost tooth set.

This number five corresponds to the number of teeth 15 of each half-pinion 5 or 6. There could nevertheless be a different number, but which however would be a multiple of five, which is to say ten, fifteen, twenty, etc.

The only mechanical requirement resides in the fact that the plane passing through the split between the two half-pinions 5 and 6, must pass through the initial radius 18 of the region 17 for changing the ratio of the plate 7, as will be explained further hereinafter.

Figure 4:
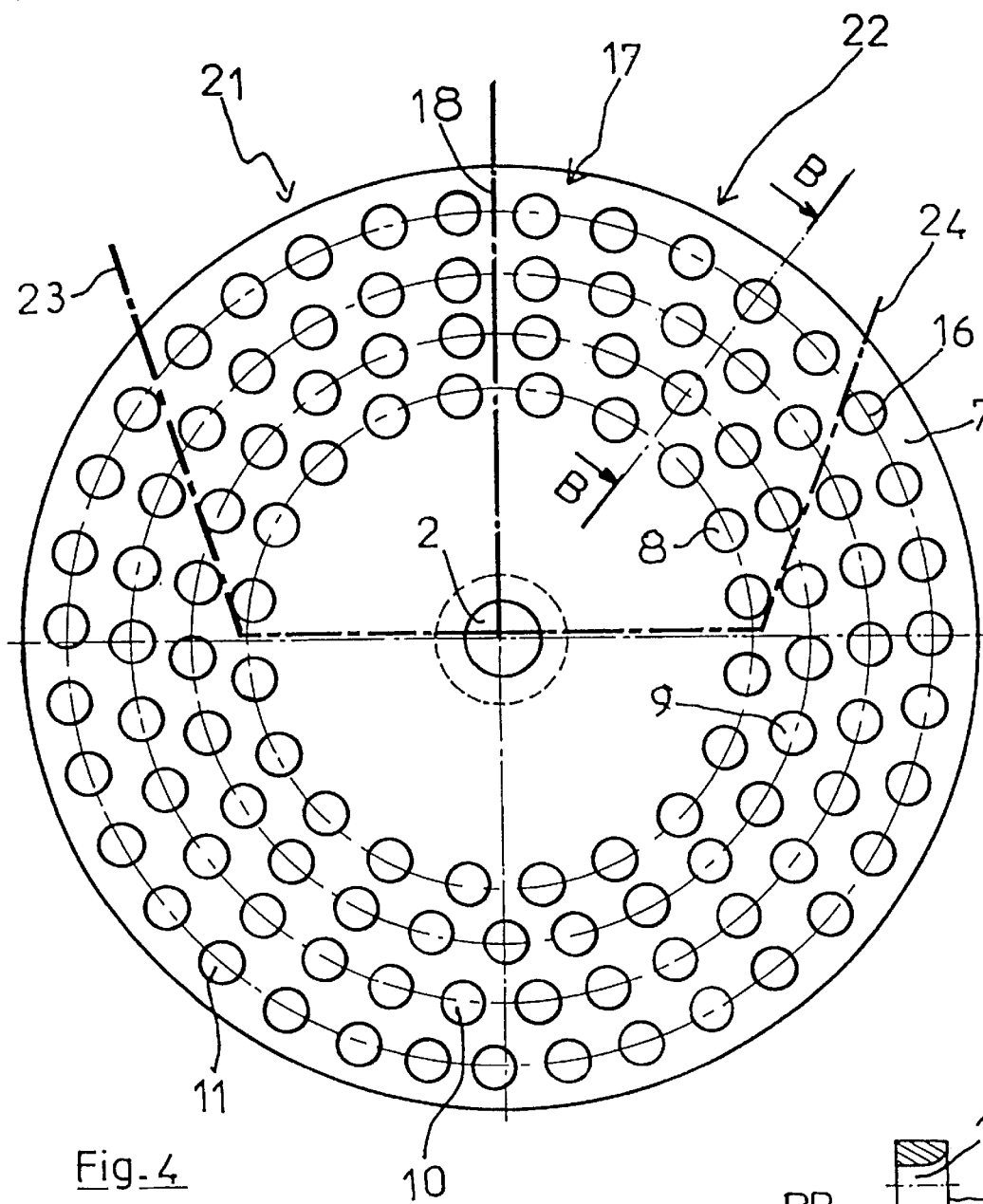
FIG. 4 is a front view of the plate.

Of course, the distance which separates two teeth 15, when the two half-pinions 5 and 6 are coplanar, is identical to the distance which separates two adjacent bores 16 of a same concentric tooth set 8 to 14. In connection with H this, if FIGS. 2 and 4 show a plate 7 having four concentric tooth sets 8 to 11, said plate can be of greater diameter to receive other tooth sets 12 to 14, as is the case in FIG. 1, in which five other tooth sets 12 to 14 are schematically shown in phantom view.

It is evident that the number of teeth 15, bores 16 and tooth sets 8 to 14 is not limited. It is possible to provide transmission 1 having a different base number than five.

To permit good sliding of the half-pinions 5 and 6, upon ratio change (in FIGS. 2 and 4, there is a transmission with four ratios and four or nine ratios in FIG. 1), along the shaft 3, the latter shaft 3 comprises, at the level of the change region 17, a structural modification comprising longitudinal grooves 19, which are shown in transverse cross-section in FIG. 3 and are disposed on opposite surfaces of a square, such that the shaft 3 in transverse cross-section is of channeled form, and more precisely of a H shape, whilst outside the region 17, said shaft 3 is of conventional shape, which is to say round. The half-pinions 5 and 6 therefore have a shape that is complementary and cooperate each with a portion of each groove 19. In FIG. 1, in which the number of concentric teeth sets 8 to 14 is nine, the grooves 19 are longer than in FIG. 2, in which the number of concentric tooth sets 8 to 11 is four.

Moreover, further to improve the guidance in sliding of the half-pinions 5 and 6 relative to each other and relative to the shaft 3, said half-pinions 5 and 6 are prolonged along the grooves 19 in the form of skirts 20.

As to the movement of the half-pinions 5 and 6 in the direction of arrow F3, this is rendered possible by any electromechanical apparatus known to the public which will be sufficiently precise and rapid to permit the offset of one of the half-pinions 5 or 6 relative to the other 6 or 5 upon rotation by one half-turn on itself of the pinion 4 in the direction of the arrow F2.

The procedure for ratio change is therefore as follows.

The importance of the ratio change region 17 of the plate 7 should now be noted. In this region 17, all the concentric tooth sets 8 to 11 are positioned such that the bores 16, of all the tooth sets 8 to 11, situated to the right of the initial radius 18, will be disposed one behind the other according to a straight line which is parallel to said initial radius 18. This is also true for the bores 16 located to the left, such that the ratio change region 17, the distances between the adjacent bores to the right or to the left of the radius 18 of the different concentric tooth sets 8 to 11 are constant.

The operation is hence as follows.

When there is no ratio change, the pinion 4 behaves like a normal pinion, which is to say that the two half-pinions remain coplanar.

When a ratio change is required, either manually or automatically the pinion 5 or 6, which is not engaged in a region which is a so-called pre-ratio change region 21, delimited on the one hand by a line 23 and on the other hand by the initial radius 18, will be displaced such that its plane will be tangent to the selected concentric tooth set 8 to 11. At said initial radius 18, one of the half-pinions 5 or 6 will coact with the former tooth set 8 to 11 at the region 21, whilst the other half-pinion 5 or 6 will coact with the new tooth set 8 to 11 which has been selected, in a post-ratio change region 22, delimited by a line 24 and the initial radius 18. In this region of ratio post-change 22, the half-pinion 6 or 5, which is no longer engaged, will then return to the plane constituted by the other half-pinion 5 or 6, engaged with the new tooth set 8 to 11, and hence with a new multiplication ratio.

REFERENCES

1. Transmission
2. Drive shaft
3. Driven shaft
4. Pinion
5. First half-pinion of pinion 4
6. Second half-pinion of pinion 4
7. Plate
8 to 14. Concentric tooth sets of plate 7
15. Teeth of pinion 4
16. Teeth or transverse recesses of the plate 7
17. Ratio change region of the plate 7
18. Initial radius
19. Longitudinal grooves of the shaft 3
20. Skirts
21. Ratio pre-change region
22. Ratio post-change region
23. Pre-ratio change line
24. Post-ratio change line
F1. Movement of rotation of the shaft 2 and of the plate 7
F2. Movement of rotation of the shaft 3 and of the pinion 4
F3. Axial displacement of the two half-pinions 5 and 6 relative to each other and relative to the shaft 3

What is claimed is:

1. A transmission comprising at least one gear adapted to transmit rotary movement of a drive shaft to a driven shaft, of variable speed ratio, the two shafts not being coaxial, a first of said shafts carrying a pinion, and the second shaft carrying a plate;

the pinion being split axially into two half-pinions movable axially one relative to the other and also relative to the first shaft which supports said half-pinions, the two half-pinions being fixed in rotation relative to said first shaft;

the plate having a plurality of surfaces, and being secured to the second shaft, and comprising, on at least one of said surfaces, several tooth sets concentric with said second shaft, which coact with the pinion; and means for axially displacing the two half-pinions so as to change the engaged concentric tooth set and thus alter the speed ratio.

2. The transmission according to claim 1, wherein the pinion comprises 2n teeth, each half-pinion comprises n teeth, and each concentric tooth set of the plate comprises a multiple of n teeth, n being a positive whole number.

3. The transmission according to claim 2, wherein the distance separating two adjacent teeth of the pinion, the two half-pinions being in the same plane, is identical to the distance separating two adjacent teeth of a same concentric tooth set of the plate.

4. The transmission according to claim 2, wherein the difference existing between the number of teeth of two adjacent concentric tooth sets of the plate is equal to n or to a multiple of n.

5. The transmission according to claim 1, wherein the plate comprises a changing region for the concentric tooth set engaged by the half-pinions, which is formed by alignments of two adjacent teeth of each concentric tooth set, the two alignments being parallel and located on opposite sides of an initial radius of the plate.

6. The transmission according to claim 5, wherein the distance separating two adjacent teeth of a same alignment is constant.

7. The transmission according to claim 1, wherein the teeth of the pinion have a spherical shape, and the teeth of the concentric tooth sets comprise edges of transverse blind holes provided in at least one surface of the plate.

8. The transmission according to claim 1, wherein the teeth of the pinion have a spherical shape, and the teeth of the concentric tooth sets comprise edges of transverse bores provided in the plate.

9. The transmission according to claim 1, wherein the first shaft, which carries the axially movable pinion that is fixed in rotation relative to said first shaft, is, in transverse cross-section, channelled over at least the length of the first shaft coacting with the pinion, thereby creating at least one groove ensuring the axial mobility and the securement in rotation of each half-pinion of complementary shape relative to the first shaft.

10. The transmission according to claim 9, wherein the transverse cross-section of the first shaft of the pinion has an H shape, which is constituted by a grooved square on two of opposite surfaces.

11. The transmission according to claim 1, wherein on opposite sides of a plane formed by the pinion, said pinion extends in the form of two skirts of a shape complementary to the first shaft.

12. The transmission according to claim 1, wherein the first shaft is a drive shaft and the second shaft is a driven shaft.

13. The transmission according to claim 1, wherein the second shaft is a drive shaft, and the first shaft is a driven shaft.

14. The transmission according to claim 1, wherein the axis of the shaft of the pinion and of the plate are perpendicular and intersect.

15. The transmission according to claim 1, wherein the plate coacts with at least one other pinion.

16. The transmission according to claim 15, wherein the transmission uses two plates comprising blind holes disposed side by side and having open free surfaces; and at least one pinion coacts with one of the surfaces and at least one other pinion coacts with another surface.

17. The transmission according to claim 15, wherein at least one pinion coacts with one of the surfaces of the plate, and at least one pinion coacts with another surface of the plate.

18. The transmission according to claim 5, wherein upon changing the concentric tooth set that is engaged, an axial plane, defined by one of the half-pinions and by the other half-pinion, passes through the initial radius of the plate.

* * * * *